United States Patent
Stoltz

(10) Patent No.: US 7,115,514 B2
(45) Date of Patent: Oct. 3, 2006

(54) SEMICONDUCTOR MANUFACTURING USING OPTICAL ABLATION

(75) Inventor: Richard Stoltz, Plano, TX (US)

(73) Assignee: Raydiance, Inc., Orlando, FL (US)

( * ) Notice: Subject to any disclaimer, the term of this patent is extended or adjusted under 35 U.S.C. 154(b) by 50 days.

(21) Appl. No.: 10/957,271

(22) Filed: Oct. 1, 2004

(65) Prior Publication Data

US 2005/0074974 A1 Apr. 7, 2005

Related U.S. Application Data

(60) Provisional application No. 60/508,136, filed on Oct. 2, 2003.

(51) Int. Cl.
*H01L 21/302* (2006.01)

(52) U.S. Cl. .................. 438/690; 438/940

(58) Field of Classification Search ............... 438/690, 438/940, 463
See application file for complete search history.

(56) References Cited

U.S. PATENT DOCUMENTS

| | | | |
|---|---|---|---|
| 3,631,362 A | 12/1971 | Almasi et al. |
| 3,808,549 A | 4/1974 | Maurer |
| 3,963,953 A | 6/1976 | Thornton, Jr. |
| 4,289,378 A | 9/1981 | Remy et al. |
| 4,718,418 A | 1/1988 | L'Esperance, Jr. |
| 4,722,591 A | 2/1988 | Haffner |
| 4,750,809 A | 6/1988 | Kafka et al. |
| 4,808,000 A | 2/1989 | Pasciak |
| 4,815,079 A | 3/1989 | Snitzer et al. |
| 4,824,598 A | 4/1989 | Stokowski |
| 4,829,529 A | 5/1989 | Kafka |
| 4,902,127 A | 2/1990 | Byer et al. |
| 4,913,520 A | 4/1990 | Kafka |
| 4,915,757 A | 4/1990 | Rando |
| 4,972,423 A | 11/1990 | Alfano et al. |
| 5,014,290 A | 5/1991 | Moore et al. |
| 5,132,996 A | 7/1992 | Moore et al. |
| 5,162,643 A | 11/1992 | Currie |
| 5,166,818 A | 11/1992 | Chase et al. |
| 5,187,759 A | 2/1993 | DiGiovanni et al. |
| 5,237,576 A | 8/1993 | DiGiovanni et al. |
| 5,265,107 A | 11/1993 | Delfyett, Jr. |
| 5,291,501 A | 3/1994 | Hanna |
| 5,302,835 A | 4/1994 | Bendett et al. |
| 5,313,262 A | 5/1994 | Leonard |
| 5,329,398 A | 7/1994 | Lai et al. |
| 5,367,143 A | 11/1994 | White, Jr. |

(Continued)

FOREIGN PATENT DOCUMENTS

EP 214100 A 3/1987

(Continued)

OTHER PUBLICATIONS

U.S. Appl. No. 10/916,368, filed Aug. 11, 2004, Stoltz, Pulse Energy Adjustment for Changes in Ablation Spot Size.

(Continued)

*Primary Examiner*—Duy-Vu N. Deo
*Assistant Examiner*—Binh X. Tran
(74) *Attorney, Agent, or Firm*—Carr & Ferrell LLP

(57) ABSTRACT

The present invention relates to methods and systems for ablation based material removal configuration for use in semiconductor manufacturing that includes the steps of generating an initial wavelength-swept-with-time optical pulse in an optical pulse generator, amplifying the initial pulse, compressing the amplified pulse to a duration of less than about 10 picoseconds and applying the compressed optical pulse to the wafer surface, to remove material from, e.g., wafer surface.

19 Claims, 1 Drawing Sheet

U.S. PATENT DOCUMENTS

| | | |
|---|---|---|
| 5,400,350 A | 3/1995 | Galvanauskas |
| 5,411,918 A * | 5/1995 | Keible et al. ............... 257/737 |
| 5,414,725 A | 5/1995 | Fermann et al. |
| 5,418,809 A | 5/1995 | August, Jr. et al. |
| 5,430,572 A | 7/1995 | DiGiovanni et al. |
| 5,440,573 A | 8/1995 | Fermann |
| 5,450,427 A | 9/1995 | Fermann et al. |
| 5,479,422 A | 12/1995 | Fermann et al. |
| 5,489,984 A | 2/1996 | Hariharan et al. |
| 5,499,134 A | 3/1996 | Galvanauskas et al. |
| 5,517,043 A | 5/1996 | Ma et al. |
| 5,548,098 A | 8/1996 | Sugawara et al. |
| 5,572,335 A | 11/1996 | Stevens |
| 5,572,358 A | 11/1996 | Gabl et al. |
| 5,585,652 A | 12/1996 | Kamasz et al. |
| 5,585,913 A | 12/1996 | Hariharan et al. |
| 5,592,327 A | 1/1997 | Gabl et al. |
| 5,596,668 A | 1/1997 | DiGiovanni et al. |
| 5,602,677 A | 2/1997 | Tournois |
| 5,617,434 A | 4/1997 | Tamura et al. |
| 5,627,848 A | 5/1997 | Fermann et al. |
| 5,633,750 A | 5/1997 | Nogiwa et al. |
| 5,633,885 A | 5/1997 | Galvanauskas et al. |
| 5,656,186 A | 8/1997 | Mourou et al. |
| 5,663,731 A | 9/1997 | Theodoras, II et al. |
| 5,677,769 A | 10/1997 | Bendett |
| 5,689,519 A | 11/1997 | Fermann et al. |
| 5,696,782 A | 12/1997 | Harter et al. |
| 5,701,319 A | 12/1997 | Fermann |
| 5,703,639 A | 12/1997 | Farrier et al. |
| 5,708,669 A | 1/1998 | DiGiovanni et al. |
| 5,710,424 A | 1/1998 | Thoedoras, II et al. |
| 5,720,894 A | 2/1998 | Neev et al. |
| 5,726,855 A | 3/1998 | Mourou et al. |
| 5,778,016 A | 7/1998 | Sucha et al. |
| 5,818,630 A | 10/1998 | Fermann et al. |
| 5,822,097 A | 10/1998 | Tournois |
| 5,847,863 A * | 12/1998 | Galvanauskas et al. .. 359/341.3 |
| 5,862,287 A | 1/1999 | Stock et al. |
| 5,867,304 A | 2/1999 | Galvanauskas et al. |
| 5,875,408 A | 2/1999 | Bendett et al. |
| 5,880,823 A | 3/1999 | Lu |
| 5,880,877 A | 3/1999 | Fermann et al. |
| 5,898,485 A | 4/1999 | Nati, Jr. |
| 5,907,157 A | 5/1999 | Yoshioka et al. |
| 5,920,668 A | 7/1999 | Uehara et al. |
| 5,923,686 A | 7/1999 | Fermann et al. |
| 5,936,716 A | 8/1999 | Pinsukanjana et al. |
| 6,014,249 A | 1/2000 | Fermann et al. |
| 6,020,591 A | 2/2000 | Harter et al. |
| 6,034,975 A | 3/2000 | Harter et al. |
| 6,061,373 A | 5/2000 | Brockman et al. |
| 6,072,811 A | 6/2000 | Fermann et al. |
| 6,075,588 A | 6/2000 | Pinsukanjana et al. |
| 6,081,369 A | 6/2000 | Waarts et al. |
| 6,120,857 A | 9/2000 | Balooch et al. |
| 6,130,780 A | 10/2000 | Joannopoulos et al. |
| 6,151,338 A | 11/2000 | Grubb et al. |
| 6,154,310 A | 11/2000 | Galvanauskas et al. |
| 6,156,030 A | 12/2000 | Neev |
| 6,181,463 B1 | 1/2001 | Galvanauskas et al. |
| 6,198,568 B1 | 3/2001 | Galvanauskas et al. |
| 6,208,458 B1 | 3/2001 | Galvanauskas et al. |
| 6,249,630 B1 | 6/2001 | Stock et al. |
| 6,252,892 B1 | 6/2001 | Jiang et al. |
| 6,256,328 B1 | 7/2001 | Delfyett et al. |
| 6,269,108 B1 | 7/2001 | Tabirian et al. |
| 6,275,512 B1 | 8/2001 | Fermann |
| 6,303,903 B1 | 10/2001 | Liu |
| 6,314,115 B1 | 11/2001 | Delfyett et al. |
| 6,327,074 B1 | 12/2001 | Bass et al. |
| 6,327,282 B1 | 12/2001 | Hammons et al. |
| 6,334,011 B1 | 12/2001 | Galvanauskas et al. |
| 6,335,821 B1 | 1/2002 | Suzuki et al. |
| RE37,585 E | 3/2002 | Mourou et al. |
| 6,355,908 B1 | 3/2002 | Tatah et al. |
| 6,362,454 B1 | 3/2002 | Liu |
| 6,365,869 B1 | 4/2002 | Swain et al. |
| 6,370,171 B1 | 4/2002 | Horn et al. |
| 6,404,944 B1 | 6/2002 | Wa et al. |
| 6,421,169 B1 | 7/2002 | Bonnedal et al. |
| 6,433,303 B1 | 8/2002 | Liu et al. |
| 6,433,305 B1 | 8/2002 | Liu et al. |
| 6,433,760 B1 | 8/2002 | Vaissie et al. |
| 6,501,590 B1 | 12/2002 | Bass et al. |
| 6,522,460 B1 | 2/2003 | Bonnedal et al. |
| 6,525,873 B1 | 2/2003 | Gerrish et al. |
| 6,526,327 B1 | 2/2003 | Kar et al. |
| 6,529,319 B1 | 3/2003 | Youn et al. |
| 6,549,547 B1 | 4/2003 | Galvanauskas et al. |
| 6,567,431 B1 | 5/2003 | Tabirian et al. |
| 6,573,813 B1 | 6/2003 | Joannopoulos et al. |
| 6,574,024 B1 | 6/2003 | Liu |
| 6,576,917 B1 | 6/2003 | Silfvast |
| 6,580,553 B1 | 6/2003 | Kim et al. |
| 6,597,497 B1 | 7/2003 | Wang et al. |
| 6,603,911 B1 | 8/2003 | Fink et al. |
| 6,621,040 B1 * | 9/2003 | Perry et al. ............. 219/121.67 |
| 6,621,045 B1 | 9/2003 | Liu et al. |
| 6,627,844 B1 | 9/2003 | Liu et al. |
| 6,642,477 B1 | 11/2003 | Patel et al. |
| 6,647,031 B1 | 11/2003 | Delfyett et al. |
| 6,654,161 B1 | 11/2003 | Bass et al. |
| 6,661,816 B1 | 12/2003 | Delfyett et al. |
| 6,671,298 B1 | 12/2003 | Delfyett et al. |
| 6,690,686 B1 | 2/2004 | Delfyett et al. |
| 6,706,998 B1 * | 3/2004 | Cutler ................... 219/121.72 |
| 6,710,288 B1 | 3/2004 | Liu et al. |
| 6,710,293 B1 | 3/2004 | Liu et al. |
| 6,720,519 B1 | 4/2004 | Liu et al. |
| 6,723,991 B1 | 4/2004 | Sucha et al. |
| 6,728,439 B1 | 4/2004 | Weisberg et al. |
| 6,735,229 B1 | 5/2004 | Delfyett et al. |
| 6,738,144 B1 | 5/2004 | Dogariu |
| 6,744,555 B1 | 6/2004 | Galvanauskas et al. |
| 6,749,285 B1 | 6/2004 | Liu et al. |
| 6,774,869 B1 | 8/2004 | Biocca et al. |
| 6,782,207 B1 | 8/2004 | Efimov |
| 6,787,734 B1 | 9/2004 | Liu |
| 6,788,864 B1 | 9/2004 | Ahmad et al. |
| 6,791,060 B1 | 9/2004 | Dunsky et al. |
| 6,801,551 B1 | 10/2004 | Delfyett et al. |
| 6,803,539 B1 | 10/2004 | Liu et al. |
| 6,804,574 B1 | 10/2004 | Liu et al. |
| 6,807,375 B1 | 10/2004 | Dogariu |
| 6,815,638 B1 | 11/2004 | Liu |
| 6,819,694 B1 | 11/2004 | Jiang et al. |
| 6,819,837 B1 | 11/2004 | Li et al. |
| 6,822,251 B1 | 11/2004 | Arenberg et al. |
| 6,829,517 B1 | 12/2004 | Cheng et al. |
| 6,878,900 B1 | 4/2005 | Corkum et al. |
| 6,897,405 B1 | 5/2005 | Cheng et al. |
| 2002/0003130 A1 * | 1/2002 | Sun et al. .............. 219/121.68 |
| 2002/0176676 A1 | 11/2002 | Johnson et al. |
| 2004/0231682 A1 | 11/2004 | Stoltz |
| 2005/0035097 A1 | 2/2005 | Stoltz |
| 2005/0038487 A1 | 2/2005 | Stoltz |
| 2005/0061779 A1 | 3/2005 | Blumenfeld et al. |
| 2005/0065502 A1 | 3/2005 | Stoltz |
| 2005/0077275 A1 | 4/2005 | Stoltz |
| 2005/0127049 A1 | 6/2005 | Woeste et al. |
| 2005/0167405 A1 | 8/2005 | Stoltz et al. |
| 2005/0171516 A1 | 8/2005 | Stoltz |
| 2005/0171518 A1 | 8/2005 | Stoltz et al. |

| 2005/0177143 | A1 | 8/2005 | Bullington et al. |
| 2005/0195726 | A1 | 9/2005 | Bullington et al. |

FOREIGN PATENT DOCUMENTS

| JP | 2003181661 A | 7/2003 |
| WO | WO 9428972 A1 | 12/1994 |
| WO | WO 2004/105100 A2 | 12/2004 |
| WO | WO 2004/114473 A2 | 12/2004 |
| WO | WO 2005/018060 A2 | 2/2005 |
| WO | WO 2005/018061 A2 | 2/2005 |
| WO | WO 2005/018062 A2 | 2/2005 |
| WO | WO 2005/018063 A2 | 2/2005 |

OTHER PUBLICATIONS

U.S. Appl. No. 11/057,867, filed Feb. 13, 2005, Mielke, Method of Generating an Ultra-Short Pulse Using a High-Frequency Ring Oscillator.

U.S. Appl. No. 11/057,868, filed Feb. 13, 2005, Mielke, Amplifying of high Energy Laser Pulses.

U.S. Appl. No. 11/224,867, filed Sep. 12, 2005, Delfyett, Laser Ablation Method and Apparatus Having a Feedback Loop and Control Unit.

U.S. Appl. No. 11/233,634, filed Sep. 22, 2005, Brennan, III, Wavelength-Stabilized Pump Diodes for Pumping Gain Media in an Ultrashort Pulsed Laser System.

U.S. Appl. No. 11/112,256, filed Apr. 22, 2005, Brennan, III, Bragg Fibers in Systems for the Generation of High Peak Power Light.

U.S. Appl. No. 11/229,302, filed Sep. 15, 2005, Mielke, Actively Stabilized Systems for the Generation of Ultrashort Optical Pulses.

U.S. Appl. No. 10/916,365, filed Aug. 11, 2005, Stoltz, Ablative Material Removal with a Preset Removal Rate or Volume or Depth.

Yeh et al., "Theory of Bragg Fiber", Journal of the Optical Society America, Sep. 1978, pp. 1196, vol. 68, No. 9.

Engeness et al., "Dispersion Tailoring and Compensation by Modal Interations in Omniguide Fibers," Optics Express, May 19, 2003, pp. 1175-1196, vol. 11, No. 10.

Fink et al., "Guiding Optical Light in Air Using an All-Dielectric Structure," Journal of Lightwave Technology, Nov. 1999, pp. 2039-2041, vol. 17, No. 11.

Siegman, "Unstable Optical Resonators", Applied Optics, Feb. 1974, pp. 353-367, vol. 13, No. 2.

Koechner, "Solid State Laser Engineering", Oct. 29, 1999, Section 5.5, pp. 270-277, 5th Edition, Springer.

Chen et al. "Dispersion-Managed Mode Locking", Journal of the Optical Society of America B, Nov. 1999, pp. 1999-2004, vol. 16, No. 11, Optical Society of America.

Resan et al. "Dispersion-Managed Semiconductor Mode-Locked Ring Laser", Optics Letters, Aug. 1, 2003, pp. 1371-1373, vol. 28, No. 15, Optical Society of America.

Dasgupta, S. et al., "Design of Dispersion-Compensating Bragg Fiber with an Ultrahigh Figure of Merit," Optics Letters, Aug. 1, 2005, vol. 30, No. 15, Optical Society of America.

Mohammed, W. et al., "Selective Excitation of the TE01 Mode in Hollow-Glass Waveguide Using a Subwavelength Grating," IEEE Photonics Technology Letters, Jul. 2005, vol. 17, No. 7, IEEE.

Delfyett, P et al., "Ultrafast Semiconductor Laser-Diode-Seeded Cr:LiSAF Rengerative Amplifier System", Applied Optics, May 20, 1997, pp. 3375-3380, vol. 36, No. 15, Octoical Society of America.

Levy et al., "Engineering Space-Variant INhomogeneous Media for Polarization Control," Optics Letters, Aug. 1, 2004, pp. 1718-1720, vol. 29, No. 15, Optical Society of America.

Ibanescu et al., "Analysis of Mode Structure in Hollow Dielectric Waveguide Fibers," Physical Review E 67, 2003, The American Physical Society.

* cited by examiner

SEMICONDUCTOR MANUFACTURING USING OPTICAL ABLATION

CROSS-REFERENCE TO RELATED APPLICATIONS

This application claims priority to U.S. Provisional Application: entitled "Semiconductor Manufacturing Using Optical Ablation," Ser. No. 60/508,136, filed Oct. 2, 2003.

TECHNICAL FIELD OF THE INVENTION

The present invention relates in general to the field of light amplification and, more particularly, a laser amplifier configuration for use in semiconductor manufacturing.

BACKGROUND OF THE INVENTION

Heretofore in this field, ablative removal of material is generally done with a short optical pulse that is stretched amplified and then compressed. A number of types of laser amplifiers have been used for the amplification.

Laser machining can remove ablatively material by disassociate the surface atoms and melting the material. Laser ablation is efficiently done with a beam of short pulses (generally a pulse-duration of three picoseconds or less). Techniques for generating these ultra-short pulses (USP) are described, e.g., in a book entitled "Femtosecond Laser Pulses" (C. Rulliere, editor), published 1998, Springer-Verlag Berlin Heidelberg New York. Generally large systems, such as Ti:Sapphire, are used for generating ultra-short pulses (USP).

The USP phenomenon was first observed in the 1970's, when it was discovered that mode-locking a broad-spectrum laser could produce ultra-short pulses. The minimum pulse duration attainable is limited by the bandwidth of the gain medium, which is inversely proportional to this minimal or Fourier-transform-limited pulse duration. Mode-locked pulses are typically very short and will spread (i.e., undergo temporal dispersion) as they traverse any medium. Subsequent pulse-compression techniques are often used to obtain USP's. Pulse dispersion can occur within the laser cavity so that compression techniques are sometimes added intracavity. When high-power pulses are desired, they are intentionally lengthened before amplification to avoid internal component optical damage. This is referred to as "Chirped Pulse Amplification" (CPA). The pulse is subsequently compressed to obtain a high peak power (pulse-energy amplification and pulse-duration compression).

SUMMARY OF THE INVENTION

The method and system of the present invention removes ablatively removing material by disassociating the surface atoms. The present invention may be used as a semiconductor manufacturing technique that uses short pulse optical ablation of wafer surfaces (e.g., with silicon, GaAs or InP substrates). The use of short pulse optical ablation as a type of material removal is applicable to any type of material (including hard to dry-etch materials such as copper and noble metals, and even diamond). Short pulse optical ablation as a type of material removal can be done with minimal-temperature rise, high-accuracy because it avoids thermal effects during machining at minimal-pressure.

Optical ablation can be used to remove material from a surface acting to accomplish optical ablation scribing. The use of optical ablation scribing can reduce significantly chip breakage, as the stress-increasing scratching during normal scribing is avoided. The ability to ablate any material with dry removal avoids problems of melting or wet-etching (including capillary action). During surface cleaning, hydrocarbon contaminants are ablated, and particles larger than the wavelength are both ablated and electro-statically repelled from the surface. As the top few monolayers of the surface are removed, the atoms leave at high velocity removing even sub-micron particles that are smaller than the wavelength of the light. Damaged crystalline layers on the surface can be removed without damaging layers below them. Auger-type material composition sensing can be done with high accuracy due to the avoiding of the normal Auger thermal distortions. Optical ablation trench digging can be done to a precise depth using material sensing of stop-indication buried layer. Multi-process lithography steps can be eliminated, reducing processing time, especially in prototyping and lower volume production.

As described herein, the use of optical ablation scribing avoided the stress-increasing scratching during normal scribing and chip breakage can be significantly reduced. The ability to ablate any material with dry removal avoids problems during surface cleaning. During optical ablative surface cleaning particles larger than the wavelength are both ablated and electro-statically repelled from the surface and as the top few monolayers of the surface are removed, the atoms are removed as high velocity ions, removing even sub-micron particles (e.g., smaller than the wavelength of the light). Additionally, contaminants (e.g., hydrocarbon) are also ablated using the present invention.

Further, Auger-type material composition sensing can be done with high accuracy due to the avoiding of the normal Auger thermal distortions as a result of sidewall evaporation, etc. Optical ablation trench or groove formation can be done to a precise depth using material sensing of a stop-indicating buried layer. Additionally, multi-process lithography steps can be eliminated during patterning, which results in a reduction in processing time. Therefore, optical ablation is especially beneficial in creating prototypes and lower volume production.

As illustrated by FIG. 1, optical ablation can also be used as a method of removing material from surface of a semiconductor wafer including the steps of: step 100, generating an initial wavelength-swept-with-time optical pulse in an optical pulse generator: step 110, amplifying the initial pulse: step 120, compressing the amplified pulse to a duration of less than about 10 picoseconds: and step 130, applying the compressed optical pulse to the wafer surface, to remove material from wafer surface. The semiconductor wafer may have a substrate of silicon, GaAs, InP or combinations thereof. However, persons of ordinary skill in the art will recognize the semiconductor wafer substrate may be constructed of a variety of materials. The amplifying may be done with either a fiber-amplifier, e.g., a erbium-doped fiber amplifier (or EDFA) or a Cr:YAG amplifier or a SOA (semiconductor optical amplifier). A semiconductor optical amplifier (SOA) preamplifier may be used to amplify the selected pulses before introduction into the optical amplifier. A sub-picosecond pulses of between about ten (10) picoseconds and one (1) nanosecond, followed by pulse selection, with the selected pulses amplified by an optical-amplifier. The optical amplifier may be an erbium-doped fiber amplifier (or EDFA) amplifier and compressed by an air-path between gratings compressor (e.g., a Treacy grating compressor), with the compression creating a sub-picosecond ablation pulse. Alternatively, the optical amplifier may be a Cr:YAG amplifier and compressed by an air-path between gratings compressor (e.g., a Treacy grating compressor), with the compression creating a sub-picosecond ablation pulse. Other embodiments may use multiple amplifiers.

In some embodiments, two or more optical amplifiers may be used in a train mode (e.g., pulses from one amplifier being delayed to arrive one or more nanoseconds after those from another amplifier) to give a rapid and controllable material ablation rate and/or the compressed optical pulse is applied to the surface in a spot with an area between the areas of one (1) and fifty (50) micron diameter circles. However, other embodiments may use a spot with an area less than a 1 micron diameter circles and still other embodiments may use a spot with an area greater than a 10 micron diameter circle. The use of one or more amplifiers in train mode allows step-wise control of ablation rate independent of pulse energy density. Embodiments in which a lower ablation rate is desired, one or more amplifiers can be shut down. Adjustments in the ablation rate allow more efficient ablation of a variety of materials with different ablation thresholds.

The amplified pulse may be compressed to a duration of less than about ten (10) picoseconds. In some embodiments, the amplified pulse is compressed to a duration of between about 1 to 5 or 5 to 10 picoseconds. In other embodiments the amplified pulse may be compressed to a duration of less than one picosecond, e.g., between about 0.01 to 0.05, 0.05 to 0.1, 0.1 to 0.5 and 0.5 to 1.0 picosecond.

The compressed optical pulse is applied the to the wafer surface. The energy density applied to the surface depends on the ablation threshold of the surface, which differs for different materials and compositions. In one embodiment, the energy density is between about two (2) and ten (10) times optical ablation threshold of the material being ablated. In other embodiments, energy density may be less than about two (2) times the ablation thresholds of the material being ablated or the energy density may be greater than about 10 times the ablation thresholds of the material being ablated.

In one embodiment, the ablation is preformed in a line to give minimal-pressure ablation scribing, wherein scratching of surface is reduced. The prior art creates a scribe line on wafers by scratching the surface. The wafer is then broken along the scribe lines to isolate individual semiconductor circuit chips. The prior art technique of scratching the surface to create a scribe line can be done quickly and has worked fairly well, however it has also ruined a significant number of chips. The surface scratches generated by the prior art technique are generally not smooth, thus the wafer does not always break down the scribe line, resulting in damaged wafers. Optical ablation of the present invention on the other hand is very fast and makes a very smooth trough with no stress-inducing indentations and little strain induced in the substrate. Additionally, the beam can be scanned back and forth during the ablation scribing further enhancing the generally smooth trough, no stress-inducing indentations and little strain induced in the substrate characteristics of the present invention.

In another embodiment, material is ablatively removed and thus the surface cleaned, at least partially replacing any of the many cleaning steps during semiconductor fabrication. During optical ablative surface cleaning, contaminants (e.g., hydrocarbon) are ablated, and particles larger than the wavelength are both ablated and electro-statically repelled from the surface. As the top few monolayers of the surface are removed, the atoms are ejected as high velocity ions, removing even sub-micron particles (e.g., smaller than the wavelength of the light). Optical ablative material removal for surface cleaning allows damaged crystalline layers on the surface to be removed without damaging the remaining layers. Other embodiments allow the optical ablation spot to be scanned, e.g., during cleaning to effectively increase the area of optical ablation. Scanning may be accomplished using one or more piezoelectrically driven mirrors or one piezoelectrically driven mirror and a motor driven stage.

Optical ablative material removal may also be preformed in a line to remove the surface material in that line, thus, resulting in a scratch, etching or even a trench of removed material. In some embodiments, the composition of material being removed may be evaluated, including wherein the composition of material being evaluated is analyzed to determine the point at which ablation reaches a buried stop-indication layer. In another embodiment, the optical ablation material removal is used to replace a dry-etching step, whereby hard to etch materials (e.g., copper or noble metals) can be conveniently patterned.

Optical-amplifier and air-path between gratings compressor combination can be used to amplify and compress, e.g., the amplified pulses between about ten picoseconds and one nanosecond. Alternatively, the amplifying and compressing can be done with a chirped fiber compressor combination, e.g., the initial pulses between one and twenty nanoseconds. In one embodiment, the optical amplifier may be an erbium-doped fiber amplifier, and the air-path between gratings compressor, e.g., a Treacy grating compressor. In one embodiment, more than one optical amplifier is used in parallel. In another embodiment, more than one semiconductor optical amplifier is used in parallel. Additionally, one compressor may be used in conjunction with one or more optical amplifiers.

The present invention provides amplifying and compressing done with a fiber-amplifier and air-path between gratings compressor combination, and the initial pulses are between about ten (10) picoseconds and three (3) nanoseconds, and the fiber amplifier is an erbium-doped fiber amplifier, and the air-path between gratings compressor is a Treacy grating compressor, and preferably more than one fiber amplifiers are used with one compressor. In some embodiments, the compressing may be done with a chirped fiber compressor.

Preferably the system is controlled such that pulse energy density and ablation rate are independently controlled and in some embodiments, pulse energy density, fiber amplifier operating temperature, and ablation rate are independently controlled.

DETAILED DESCRIPTION OF THE INVENTION

Figure 1:
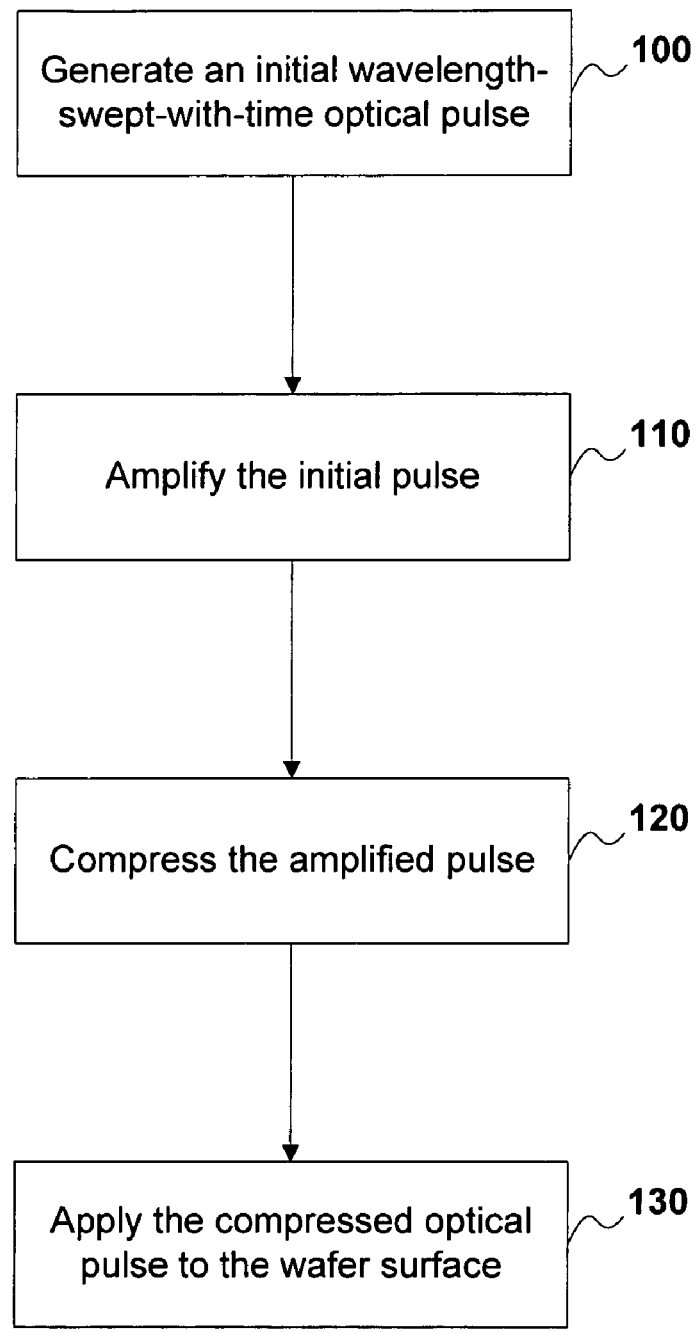
FIG. 1 is a flowchart illustrating a method included in various embodiments of the invention.

The present invention provides a method for semiconductor manufacturing techniques using short pulse optical ablation of wafer surfaces (e.g., silicon, GaAs, InP substrates or combinations thereof) for apparently the first time. The use of optical ablation type of material removal allows the removal of any type of material including hard to dry-etch materials (e.g., copper, noble metals and even diamond). Additionally, the optical ablation can done with minimal-temperature rise, high-accuracy (e.g., to avoid thermal effects during machining) and minimal-pressure.

The present invention can use optical ablation scribing to significantly reduced chip breakage. The prior art methods of scribing induce chipping of the surface giving a rough surface and high-stress areas and strains in the material. As a result, the wafer often cracks in places other than along the scribe line. Optical ablation of the present invention produces a smooth "scribe" surface without introducing strains in the wafer.

The ability to ablate any material with dry removal avoids problems of melting or wet-etching (including capillary action) and the problems of hydrocarbon removal during surface cleaning. The present invention may be combined with conventional methods of pre-cleaning if desired. Additionally, the present invention allows surface layers with crystal defects from sawing, chemical-mechanical polishing, and normal cleaning techniques can be removed without causing defects in the newly exposed surface. The optical beam also causes ionization of both the surface and any particles on the surface and, thus, can repel particles larger than the light wavelength. As the top few monolayers of the surface are removed, the atoms leave at high velocity removing the sub-micron particles, which are smaller than the wavelength of the light. One embodiment allows the optical ablation spot to be scanned during cleaning, thus increasing the effective area of ablation. The optical ablation spot is scanned by one or more piezoelectrically driven mirrors or one or more piezoelectrically driven mirror and a motor driven stage (that gives relative motion between the optical beam-emitting probe and the wafer).

The optical ablation can be used in a wide range of semiconductor processing. For example, Auger-type material composition sensing may be done with high accuracy as the present invention avoids the limitations caused by the normal Auger thermal distortions. Optical ablation material removal (e.g., etching, line or groove formation) may be done to a precise depth using material sensing of a stop-indication buried layer. The present invention allows multi-process lithography steps to be eliminated, reducing processing time, especially in prototyping and lower volume production. Additionally, hard to dry-etch materials (e.g., copper or noble metals) can be patterned without using liquids, thus, avoiding problems, such as capillary action, associated with melting or wet-etching. Optical ablation material removal is not limited by the use of a blade to remove the material, thus, allowing the removal of a thin slice of material compared to removed using a conventional sawing. The quality of the removal of the material is increased as dull, damaged or inefficient blades are not used. The related maintenance (e.g., blade replacement) is also eliminated as there is never a need to replace blades. In ablative cutting, the beam can be introduced at a perpendicular or non-perpendicular angle. Optical ablative ionization of air above one or more contact pads can allow probe-less electrical testing of individual chips, e.g., on a grounded wafer. Ablation can provide individual chip tuning by trimming capacitors or resistors without inducing extraneous thermal effects on the circuit or do fuse "blowing" (cutting links) to customize circuits.

High ablative pulse repetition rates are preferred and the total pulses per second (the total system repetition rate) from the one or more parallel optical amplifiers is preferably greater than about 0.6 million pulses per second. The use of about a one (1) nanosecond pulse with an optically-pumped pulse amplifier and air optical-compressor (e.g., a Treacy grating compressor) typically gives compression with about a 40% losses. At less than one (1) nanosecond, the losses in a Treacy grating compressor are generally lower. If the other-than-compression losses are about 10%, two (2) nano-Joules are needed from the amplifier to get one (1) nanoJoule on the target. The present invention may use a 1550 nm light for safety purposes, however other wavelength may be used. The use of greater than one (1) nanosecond pulses in an air optical-compressor presents two problems; the difference in path length for the extremes of long and short wavelengths needs to be more than about three (3) cm and thus the compressor is large and expensive, and the losses increase with a greater degree of compression. In other embodiments, a chirped fiber Bragg gratings can be used in place of the Treacy gratings for stretching and/or compressing.

The initial pulse may be generated using a semiconductor and a SOA preamplifier to amplify the initial pulse before splitting to drive multiple amplifiers may be used. Additionally, ablation of a smaller spot may be scanned to get a larger effective ablation area. The resulting scanned spot may be smaller than in the fiber-amplifier case. The present invention may use parallel amplifiers to generate a train of pulses and increases the ablation rate by further increasing the effective repetition rate, while avoiding thermal problems and allowing control of the ablation rate by the use of a lesser number of operating amplifiers. The system of the present invention may be operated with pulse energy densities on the surface of about three times the materials ablation threshold for greater ablation efficiency.

Ablative material removal often has an ablation threshold of less than one (1) Joule per square centimeter, but may occasionally require removal of material with an ablation threshold of up to about two (2) Joules per square centimeter. The use of more than one amplifier in parallel train mode allows pulses from one amplifier to be delayed to arrive one or more nanoseconds after those from another amplifier. At lower desired powers, one or more amplifiers can be shut off (e.g., the optical pumping to an optically-pumped pulse amplifier), and there will be fewer pulses per train. For example, with twenty (20) amplifiers there would be a maximum of twenty (20) pulses in a train, however many embodiments may use only three or four amplifiers and three or four pulses per train.

Generally, the optically-pumped pulse amplifiers are optically-pumped continuous wave (CW) and are amplifying perhaps 100,000 times per second in 1 nanosecond pulses. Alternately, non-CW-pumping might be used in operating amplifiers, with amplifiers operate in a staggered fashion, e.g., one on for a first half-second period and then turned off for a second half-second period, and another amplifier, dormant during the first-period, turned on during the second period, and so forth, to spread the heat load.

The present system allows control of input optical signal power into the optical amplifier, optical pumping power of optically-pumped pulse amplifiers, timing of input pulses, length of input pulses, and timing between start of optical pumping and start of optical signals into the optical amplifier to control pulse power and the average degree of energy storage in fiber.

Many optically-pumped pulse amplifiers have a maximum power of four (4) MW, and thus a ten (10) microjoule-ablation pulse could be as short as two (2) picoseconds. Thus, a ten (10) picoseconds, ten (10) microjoule pulse, at 500 kHz (or 50 microjoule with 100 kHz), and, if heating becomes a problem, operating in a train mode and switching optically-pumped pulse amplifiers. For example, optically-pumped pulse amplifier system may rotate the operation of ten (10) optically-pumped pulse amplifiers such that only five (5) were operating at any one time (e.g., each on for $\frac{1}{10}$th of a second and off for $\frac{1}{10}$th of a second). In another embodiment, ten optically-pumped pulse amplifiers may be used with time spaced inputs, e.g., by one (1) ns, to give a train of one to ten pulses. One example includes a five (5) W amplifiers operating at one hundred (100) kHz and fifty (50) microjoules this could step between one hundred (100) kHz and one (1) MHz. With 50% post-amplifier optical efficiency and fifty (50) microjoules, to get six (6) Joule per square centimeter on the target, the spot size would be about twenty (20) microns.

Another example includes a five (5) W amplifiers operating at 20 kHz and 250 microjoules and with ten (10) optically-pumped pulse amplifiers this could step between 20 kHz and 200 kHz. With about 50% post-amplifier optical efficiency and 250 microjoules, to get six (6) J/sq. cm on the target, the spot size would be about fifty (50) microns. The amplified pulse might be 100 to 250 picoseconds long. One embodiment of the present invention provides thirty (30) optically-pumped pulse amplifiers that could step between 20 kHz and 600 kHz.

In one embodiment, the pulse generator is used to control the input repetition rate of the optically-pumped pulse amplifiers to tune energy per pulse to about three times threshold per pulse. Alternatively, a sub-picosecond pulse may be generated and time-stretched within semiconductor pulse generator to give the wavelength-swept-with-time initial pulse for the optically-pumped pulse amplifier. Another alternate is to measure light leakage from the delivery fiber to get a feedback proportional to pulse power and/or energy for control purposes.

The optically-pumped optical pulse amplifiers can be controlled as in co-pending provisional applications and may including those used to pump optical devices and in general may include such shapes as slabs, discs, and rods. Additionally, the lamp-pumping can be controlled by controlling the pumping lamps in a manner similar to that of controlling pump diode current. In one embodiment, the active-diode diode pump-current is used to control the amplification of an active mirror. Generally optical pump device (e.g., diodes or lamps) current is controlled either directly or indirectly by controlling voltage, power, energy or combinations thereof. As used herein, controlling current can include shutting off one or more optical pump devices, when multiple pump devices are used.

These optical amplifiers can be in systems described, operated, controlled, and/or used in systems in generally the same manner as the fiber amplifier of the four co-pending and co-owned applications noted below by docket number, title and provisional number, were filed May 20, 2003 and are hereby incorporated by reference herein: Laser Machining provisional application No. 60/471,922; "Camera Containing Medical Tool," provisional application No. 60/472,071; "Scanned Small Spot Ablation With A High-Rep-Rate" provisional application No. 60/471,972; "Stretched Optical Pulse Amplification and Compression," provisional application No. 60/471,971. These amplifiers can be controlled and/or used in systems in generally the same manner as the fiber amplifier of the eleven co-pending applications noted below by docket number, title and provisional number, were filed Aug. 11, 2003 and are hereby incorporated by reference herein: "Controlling Repetition Rate Of Fiber Amplifier"— provisional application No. 60/494,102; "Controlling Pulse Energy Of A Fiber Amplifier By Controlling Pump Diode Current" provisional application No. 60/494,275; "Pulse Energy Adjustment For Changes In Ablation Spot Size" provisional application No. 60/494,274; "Ablative Material Removal With A Preset Removal Rate or Volume or Depth" provisional application No. 60/494,273; "Fiber Amplifier With A Time Between Pulses Of A Fraction Of The Storage Lifetime"; "Man-Portable Optical Ablation System" provisional application No. 60/494321; "Controlling Temperature Of A Fiber Amplifier By Controlling Pump Diode Current" provisional application No. 60/494,322; "Altering The Emission Of An Ablation Beam for Safety or Control" provisional application No. 60/494,267; "Enabling Or Blocking The Emission Of An Ablation Beam Based On Color Of Target Area" provisional application No. 60/494,172; "Remotely-Controlled Ablation of Surfaces" provisional application No. 60/494,276 and "Ablation Of A Custom Shaped Area" provisional application No. 60/494,180. These amplifiers can be controlled and/or used in systems in generally the same manner as the fiber amplifier of the two co-pending applications noted below by docket number and, title that were filed on Sep. 12, 2003: co-owned "Spiral-Laser On-A-Disc" inventor—Richard Stoltz; and partially co-owned "Laser Beam Propagation in Air" inventors Jeff Bullington and Craig Siders.

Although the present invention and its advantages have been described above, it should be understood that various changes, substitutions and alterations may be made herein without departing from the spirit and scope of the invention as defined by the appended claims. Moreover, the scope of the present application is not intended to be limited to the particular embodiments of the process, machine, manufacture, composition of matter, means, methods and steps described in the specification, but only by the claims.

What is claimed is:

1. A method of removing material from a surface of a semiconductor wafer comprising the steps of:
   generating an initial wavelength-swept-with-time optical pulse in an optical pulse generator;
   amplifying the initial pulse;
   compressing the amplified pulse to a duration of less than about 10 picoseconds, to generate a compressed optical pulse; and
   applying the compressed optical pulse to the wafer surface, to remove material from the wafer surface;
   wherein the step of amplifying is done with a fiber-amplifier and the step of compressing is done with an air-path between gratings compressor, and the initial wavelength-swept-with-time optical pulses is between about 10 picoseconds and about 3 nanoseconds and the compressed optical pulse has a sub-picosecond duration and an energy density on the surface is between about 2 and about 10 times an optical ablation threshold of the surface.

2. The method of claim 1, wherein the material removal is done in a line to give minimal-pressure ablation scribing, wherein stress-increasing scratching of the surface is reduced.

3. The method of claim 1, further comprising a step of sensing a composition of material being removed.

4. The method of claim 1, wherein the fiber amplifier is an erbium-doped fiber amplifier.

5. The method of claim 1, wherein the air-path between gratings compressor is a Treacy grating compressor.

6. The method of claim 1, wherein the compressing is done with a chirped fiber compressor.

7. A method of removing material from a surface of a semiconductor wafer comprising the steps of:
   generating an initial wavelength-swept-with-time optical pulse in an optical pulse generator;
   amplifying the initial pulse;

compressing the amplified pulse to a duration of less than about 10 picoseconds, to generate a compressed optical pulse; and applying the compressed optical pulse to the wafer surface, to remove material from the wafer surface;

wherein pulse energy density and ablation rate are independently controlled.

8. The method of claim 7, wherein the wafer has a silicon, GaAs, or InP substrate.

9. The method of claim 7, wherein the amplifying is done with one or more fiber-amplifier, one or more semiconductor optical amplifier or combinations thereof.

10. The method of claim 7, wherein the material removal is used to replace a dry-etching step.

11. The method of claim 7, wherein the step of amplifying uses one or more optical amplifiers in a train mode.

12. The method of claim 7, wherein the compressed optical pulse is generally circular with an area of between about 1 and 50 micron in diameter when applied to the surface.

13. The method of claim 7, wherein two or more fiber amplifiers are used in a train mode and two or more fiber amplifiers are used with one compressor.

14. The method of claim 7, wherein the compressed optical pulse is scanned on the wafer surface using one or more piezoelectrically driven mirror.

15. The method of claim 7, wherein the material removal is done in a line to give ablation trench digging.

16. The method of claim 7, wherein the material includes copper or a noble metal.

17. The method of claim 7, further comprising a step of sensing a composition of material being removed.

18. The method of claim 17, wherein a composition of material being sensed is analyzed to determine when the material removal reaches an indication layer.

19. A method of removing material from a surface of a semiconductor wafer comprising the steps of:

generating an initial wavelength-swept-with-time optical pulse in an optical pulse generator;

amplifying the initial pulse;

compressing the amplified pulse to a duration of less than about 10 picoseconds, to generate a compressed optical pulse; and applying the compressed optical pulse to the wafer surface, to remove material from the wafer surface;

wherein a pulse energy density, a fiber amplifier operating temperature and an ablation rate are independently controlled.

* * * * *